United States Patent [19]
Kawamoto et al.

[11] Patent Number: 5,733,832
[45] Date of Patent: Mar. 31, 1998

[54] DIELECTRIC CERAMIC COMPOSITION

[75] Inventors: Mitsutoshi Kawamoto, Hirakata; Yukio Hamaji, Otsu, both of Japan

[73] Assignee: Murata Manufacturing Co., Ltd., Kyoto, Japan

[21] Appl. No.: 790,772

[22] Filed: Jan. 27, 1997

[30] Foreign Application Priority Data

Jan. 26, 1996 [JP] Japan .................. 8-032761

[51] Int. Cl.$^6$ .................. C04B 35/499
[52] U.S. Cl. .................. 501/136; 252/62.9
[58] Field of Search .................. 501/136; 252/62.9

[56] References Cited

U.S. PATENT DOCUMENTS

| | | | |
|---|---|---|---|
| 5,004,715 | 4/1991 | Hakotani et al. | 501/136 |
| 5,098,869 | 3/1992 | Morimoto et al. | 501/136 |
| 5,439,857 | 8/1995 | Iwamoto et al. | 501/136 |
| 5,658,485 | 8/1997 | Cava et al. | 501/136 |

*Primary Examiner*—Deborah Jones
*Attorney, Agent, or Firm*—Ostrolenk, Faber, Gerb & Soffen, LLP

[57] ABSTRACT

A dielectric ceramic composition composed mainly of lead magnesium-niobate $[Pb(Mg_{1/3}Nb_{2/3})O_3]$, strontium titanate $[SrTiO_3]$, and lead titanate $[PbTiO_3]$, characterized in that the molar ratio of said three major components is defined by $$[Pb(Mg_{1/3}Nb_{2/3})O_3]_x \cdot [SrTiO_3]_y \cdot [PbTiO_3]_z$$

(where $x+y+z=100$ parts by mole, and each value of x, y, and z is on lines or within the area enclosed by lines passing through four points A (72, 10, 18), B (76, 5, 19), C (57, 5, 38), and D (48, 20, 32) in a triangular composition diagrams), and said three major components are supplemented by $(Pb_{1-x}Ba_x)(Cu_{1/2}W_{1/2})O_3$ (where $0 \leq x \leq 1$) in an amount less than about 5 parts by mole (excluding 0 part by mole) for 100 parts by mole of said major components. This dielectric ceramic composition can be sintered at low temperatures and has a high permittivity and a high mechanical strength.

5 Claims, 1 Drawing Sheet

DIELECTRIC CERAMIC COMPOSITION

BACKGROUND OF THE INVENTION

1. Field of the Invention

The present invention relates to a dielectric ceramic composition and, more particularly, to such a composition which is to be used as a raw material for laminated ceramic capacitors.

2. Description of the Related Art

A dielectric ceramic compound based on barium titanate ($BaTiO_3$) has been in general practical. However, it suffers the disadvantage of requiring firing at high temperatures (usually 1300°–1400° C.). When used for laminated capacitors, needed are internal electrodes of expensive precious metals (such as platinum and palladium) which withstand the high firing temperature. This leads to high production costs. Therefore, cost reduction of laminated ceramic capacitor requires a dielectric ceramic composition capable of being fired at low temperatures so that inexpensive metals (based on silver and nickel) can be used for the internal electrodes.

The basic electrical properties required of dielectric ceramic compositions include high permittivity, low dielectric loss and high insulation resistance. In addition, high mechanical strength is another requirement for dielectric ceramic compositions. This is true particularly in the case where they are used for laminated chip capacitors, which are subject to mechanical strain when mounted on a substrate because of difference in thermal expansion between the substrate and the dielectric ceramic composition constituting chip capacitors. Such strain causes cracking and damage to chip capacitors. Thus, chip capacitors depend for their reliability on the mechanical properties of the dielectric ceramic composition from which they are made.

Such being the case, there has been a demand for development of a dielectric ceramic composition which is capable of sintering at low temperatures and is superior in mechanical strength.

Japanese Patent Laid-open No. 21850/1980 discloses a dielectric ceramic composition capable of sintering at low temperatures, which is a two-component composition composed of $Pb(Fe_{2/3}W_{1/3})O_3$ and $PbZrO_3$. This composition, however, has a high dielectric loss and a low specific resistance, which need to be remedied. To overcome these disadvantages, there has been proposed a three-component composition containing $Pb(Mn_{2/3}W_{1/3})O_3$ as a third component (Japanese Patent Laid-open No. 23058/1980). This three-component composition, however, is poor in flexural strength and hence is used only for laminated capacitors intended for certain limited uses. Another ternary dielectric ceramic composition composed of $Pb(Mn_{1/3}Nb_{2/3})O_3$, $Pb(Mg_{1/2}W_{1/2})O_3$, and $PbTiO_3$ has been disclosed in Japanese Patent Laid-open No. 60670/1983. In common with the above-mentioned dielectric ceramic composition, it is not satisfactory in mechanical strength.

OBJECT AND SUMMARY OF THE INVENTION

It is an object of the present invention to provide a dielectric ceramic composition which can be sintered at low temperatures and has a high permittivity and sufficient mechanical strength.

The gist of the present invention resides in a dielectric ceramic composition composed mainly of lead magnesium-niobate $[Pb(Mg_{1/3}Nb_{2/3})O_3]$, strontium titanate $[SrTiO_3]$, and lead titanate $[PbTiO_3]$, characterized in that the molar ratio of said three major components is defined by $[Pb(Mg_{1/3}Nb_{2/3})O_3]_x \cdot [SrTiO_3]_y \cdot [PbTiO_3]_z$ (where x+y+z=100 parts by mole, and each value of x, y, and z is on lines or within the area enclosed by lines passing through four points A (72, 10, 18), B (76, 5, 19), C (57, 5, 38), and D (48, 20, 32) on a triangular composition diagram), and said three major components are supplemented by $(Pb_{1-a}Ba_a)(Cu_{1/2}W_{1/2})O_3$ (where $0 \leq a \leq 1$) in a positive amount of less than about 5 parts by mole (i.e., excluding 0 part) per 100 parts by mole of said major components.

The dielectric ceramic composition of the present invention can be sintered at low temperatures and has good dielectric properties and high mechanical strength, not achieved before. It has a flexural strength higher than 120 MPa. Because of this high strength, it finds use as a raw material for laminated chip capacitors. Some samples of this invention have a flexural strength higher than 130 MPa and a relative permittivity higher than 9000 and meet the D characteristics prescribed by JIS.

These and other objects and advantages of the invention may be readily ascertained by referring to the following description and appended drawing.

DESCRIPTION OF THE PREFERRED EMBODIMENTS

Figure 1:
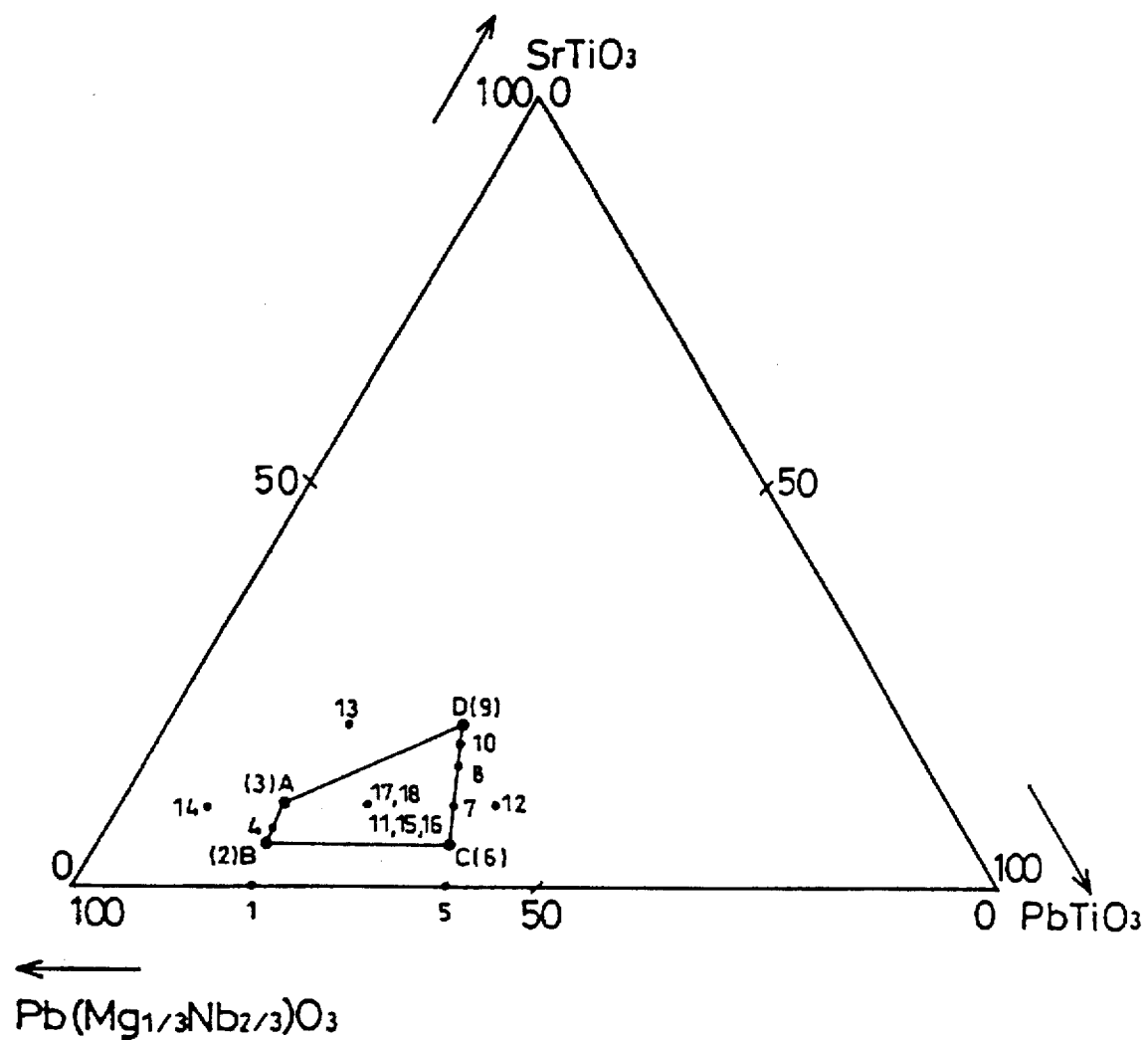
FIG. 1 is a diagram showing in triangular coordinates the ratio of major three components in each sample given in Table 1.

Each sample was prepared from $Pb_3O_4$, MgO, $Nb_2O_5$, $TiO_2$, $SrCO_3$, CuO, and $WO_3$ (technical grade) as starting materials. They were weighed such that the composition shown in Table 1 was established. They were mixed by ball-milling in deionized water (as a solvent) for 16 hours. The resulting powder was calcined in the atmosphere at 750° C. for 2 hours. The calcined powder was mixed with an organic solvent (such as toluene), a binder (such as PVB), and a plasticizer (such as DOP) to give a slurry. The slurry was formed into a green sheet (50–60 μm thick) by the doctor blade method. The green sheet was fabricated into a discoid specimen (1.0 mm thick, 10 mm in diameter) and a rectangular parallelepipedic specimen (45 mm long, 5 mm wide, 1.5 mm thick). These specimens were freed of binder in air and then fired in air at 950°–1100° C. Thus there were obtained the desired ceramic samples.

TABLE 1

| Sample | Composition (parts by mole) | | | | Flexural strength | Relative permit- | TCC (%) | |
|---|---|---|---|---|---|---|---|---|
| No. | PMN | ST | PT | PBCW | σ(m value) | tivity | −25° C. | 85° C. |
| 1* | 80 | 0 | 20 | 5 | 98 (8.3) | 4800 | −25.7 | 111 |
| 2* | 76 | 5 | 19 | 5 | 131 (4.3) | 11300 | −43.8 | −13.3 |
| 3 | 72 | 10 | 18 | 5 | 135 (6.4) | 8400 | −16.6 | −49.7 |
| 4 | 74.4 | 7 | 18.6 | 5 | 132 (6.8) | 9400 | −29.5 | −28.2 |
| 5* | 60 | 0 | 40 | 5 | 92 (12.6) | 2100 | −14.7 | 36 |

TABLE 1-continued

| Sample No. | Composition (parts by mole) | | | | Flexural strength σ(m value) | Relative permittivity | TCC (%) -25° C. | 85° C. |
|---|---|---|---|---|---|---|---|---|
| | PMN | ST | PT | PBCW | | | | |
| 6 | 57 | 5 | 38 | 5 | 129 (11.8) | 2800 | −21 | 53.7 |
| 7 | 54 | 10 | 36 | 5 | 128 (7.9) | 3500 | −23.4 | 97.8 |
| 8 | 51 | 15 | 34 | 5 | 152 (6.4) | 5600 | −33.6 | 54.3 |
| 9 | 48 | 20 | 32 | 5 | 138 (9.9) | 4700 | 1.3 | −37.4 |
| 10 | 49.2 | 18 | 32.8 | 5 | 145 (8.5) | 5300 | −15.8 | 7.5 |
| 11 | 63 | 10 | 27 | 5 | 133 (6.9) | 10000 | −45 | −20 |
| 12* | 50 | 10 | 40 | 5 | 90 (7.4) | 3000 | −30 | 90 |
| 13* | 60 | 20 | 20 | 5 | 115 (9.5) | 5000 | −5 | −32 |
| 14* | 80 | 10 | 10 | 5 | 105 (8.3) | 11000 | −50 | −10 |
| 15* | 63 | 10 | 27 | 0 | not sinterable even at 1200° C. | | | |
| 16* | 63 | 10 | 27 | 10 | 90 (7.9) | 9500 | −41 | −26 |
| 17 | 63 | 10 | 27 | 5 | 138 (7.1) | 9800 | −42 | −23 |
| 18 | 63 | 10 | 27 | 5 | 131 (7.6) | 9900 | −39 | −21 |

*Samples not conforming to the invention.
PMN: $Pb(Mg_{1/3}Nb_{2/3})O_3$
ST: $SrTiO_3$
PT: $PbTiO_3$
PBCW: $(Pb_{1-a}Ba_a)(Cu_{1/2}W_{1/2})O_3$ After coating with silver paste on both sides and baking at 800° C. in air, the discoid specimen was tested for dielectric properties. The relative permittivity ($\epsilon_r$) was measured at 25° C. for a frequency of 1 kHz and voltage of 1 V (rms). The temperature characteristics of electrostatic capacity (TCC) was expressed in terms of change (%) in the capacity at −25° C. and 85° C. relative to the capacity at 20° C. The capacity was measured for a frequency of 1 kHz and voltage of 1 V (rms).

The rectangular specimen was used to measure flexural strength by three-point bending test in the following manner. The specimen is placed on two supports, 30 mm apart, and bent by advancing the crosshead at a rate of 0.5 mm/min. The flexural strength (σ) is calculated from the formula below.

$$\sigma = 3 \times P \times L/2 \times W \times t^2$$

where

P: breaking load
L: distance between supports
W: width of the specimen
t: thickness of the specimen The value of flexural strength is an average of 15–20 measurements calculated from Weibull distribution.

The flexural strength and dielectric properties of the specimens are summarized in Table 1.

Samples Nos. 1 to 16 contain PBCW in which a=0. Sample No. 17 contains PBCW in which a=0.5. Sample No. 18 contains PBCW in which a=1.

The flexural strength (σ) is expressed in terms of MPa, and "m value" is obtained from the Weibull distribution.

The composition of each sample is plotted in the triangular composition diagram in mole percent (FIG. 1). Numerals in the triangular coordinates correspond to the sample numbers.

According to the present invention, the composition is specified as mentioned above. The reason for this is explained with reference to Table 1 and FIG. 1. Compositions which are plotted under the line B–C give rise to a flexural strength lower than 100 MPa, as in samples Nos. 1 and 5. Compositions which are plotted outside the lines C–D and A–B give rise to flexural strengths of 90 MPa and 105 MPa as in samples Nos. 12 and 14. Such values are similar to those of conventional lead-based dielectric ceramic compositions. Compositions which are plotted above the line D–A give rise to a flexural strength of 115 MPa, as in sample No. 13. This value is not high enough for the present invention. In the case where the auxiliary component is not added, as in sample No. 15, the sample cannot be sintered even at 1200° C. In other words, the sample does not take on the property that the lead-based dielectric ceramic composition can be sintered at low temperatures. In the case where the auxiliary component is added in an excess amount (more than about 5 parts by mole), as in sample No. 16, the sample is extremely poor in flexural strength (90 MPa).

As Table 1 shows, sample No. 4 has a relative permittivity of 9400 and a flexural strength of 132 MPa and sample No. 10 has a relative permittivity of 5300 and a flexural strength of 145 MPa. Moreover, the values of TCC suggest that both samples satisfy the D characteristics prescribed in JIS. This is noteworthy in view of the fact that there have never been conventional lead-based dielectric ceramic compositions which exhibit such high performance.

In preferred embodiments, x is about 48–74.2, y is about 5–20, more preferably about 7–18, and z is about 18–38, more preferably about 18.6–36.

What is claimed is:

1. A dielectric ceramic composition comprising a major component of lead magnesium-niobate [$Pb(Mg_{1/3}Nb_{2/3})O_3$], strontium titanate [$SrTiO_3$], and lead titanate [$PbTiO_3$], in a molar ratio is defined by $$[Pb(Mg_{1/3}Nb_{2/3})O_3]_x \cdot [SrTiO_3]_y \cdot [PbTiO_3]_z$$

where x+y+z=100 parts by mole, and each value of x, y, and z is on lines or within the area enclosed by lines passing through four points A (72, 10, 18), B (76, 5, 19), C (57, 5, 38), and D (48, 20, 32) on a triangular concentration diagram, and a positive amount less than about 5 parts by mole per 100 parts by mole of said major component of $(Pb_{1-a}Ba_a)(Cu_{1/2}W_{1/2})O_3$ where $0 \leq a \leq 1$.

2. The dielectric ceramic composition of claim 1 wherein x is about 48–74.2, y is about 5–20 and z is about 18–38.

3. The dielectric ceramic composition of claim 2, wherein y is about 7–18 and z is about 18.6–36 and a is 0 to about 0.5.

4. The dielectric ceramic composition of claim 1, wherein x is about 74.4, y is about 7, z is about 18.6 and containing about 5 parts of (Pb) $(Cu_{1/2}W_{1/2})O_3$.

5. The dielectric ceramic composition of claim 1, wherein x is about 49.2, y is about 18, z is about 32.8 and containing about 5 parts of (Pb) $(Cu_{1/2}W_{1/2})O_3$.

* * * * *